United States Patent
Chen et al.

(10) Patent No.: US 11,665,197 B2
(45) Date of Patent: *May 30, 2023

(54) APPARATUS AND METHOD FOR DISTINGUISHING BETWEEN LEGITIMATE AND MALICIOUS BRANCHES OF A SPLIT BLOCKCHAIN

(71) Applicant: MOAC BLOCKCHAIN TECH INC, Palo Alto, CA (US)

(72) Inventors: Xiaohu Chen, Mountain View, CA (US); Xinle Yang, Portland, OR (US); Yang Chen, Bellevue, WA (US)

(73) Assignee: MOAC BLOCKCHAIN TECH INC, Palo Alto, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 17/400,492

(22) Filed: Aug. 12, 2021

(65) Prior Publication Data

US 2021/0385246 A1 Dec. 9, 2021

Related U.S. Application Data

(63) Continuation of application No. 16/442,529, filed on Jun. 16, 2019, now Pat. No. 11,108,820.

(51) Int. Cl.
*H04L 9/40* (2022.01)
*G06F 16/182* (2019.01)
(Continued)

(52) U.S. Cl.
CPC ...... *H04L 63/1483* (2013.01); *G06F 16/1824* (2019.01); *G06F 16/1834* (2019.01); *H04L 9/0643* (2013.01); *H04L 9/50* (2022.05)

(58) Field of Classification Search
CPC ..... H04L 63/1483; H04L 9/0643; H04L 9/50; H04L 9/3239; G06F 16/1824; G06F 16/1834; G06F 16/9024
See application file for complete search history.

(56) References Cited

U.S. PATENT DOCUMENTS 9,875,510 B1 * 1/2018 Kasper ................ G06Q 40/12
2016/0358253 A1 * 12/2016 Liao ........................ G06Q 40/04
(Continued)

OTHER PUBLICATIONS

Bae, et al., "Random Mining Group Selection to Prevent 51% Attacks on Bitcoin," 2018 48th Annual IEEE/IFIP International Conference on Dependable Systems and Networks Workshops (DSN-W), Luxembourg City, [no date] 2018, downloaded on Aug. 5, 2021, pp. 81.-82.

(Continued)

*Primary Examiner* — Darren B Schwartz

(57) ABSTRACT

Nodes determine a first measure of difficulty for a first branch of a split blockchain and a second measure of difficulty for a second branch of the split blockchain. The first measure of difficulty is based on a measure of block generation frequency of each node that mined for the split blockchain during a window that comprises blocks of the first branch. The second measure of difficulty is based on a measure of block generation frequency of each node that mined for the split blockchain during a window that comprises blocks of the second branch. One of the first branch and the second branch is identified as a legitimate branch based on a comparison of the first measure of difficulty and the second measure of difficulty.

14 Claims, 6 Drawing Sheets

(51) Int. Cl.
*H04L 9/06* (2006.01)
*H04L 9/00* (2022.01)
*G06F 16/901* (2019.01)
*H04L 9/32* (2006.01)

(56) References Cited

U.S. PATENT DOCUMENTS

| | | | |
|---|---|---|---|
| 2018/0039667 A1* | 2/2018 | Pierce | H04L 9/3247 |
| 2018/0089683 A1* | 3/2018 | Setty | G06Q 20/3827 |
| 2018/0114218 A1 | 4/2018 | Konik et al. | |
| 2018/0294955 A1 | 10/2018 | Rhie et al. | |
| 2018/0336552 A1 | 11/2018 | Bohli et al. | |
| 2018/0337882 A1 | 11/2018 | Li et al. | |
| 2019/0108498 A1* | 4/2019 | Deshpande | G06Q 20/065 |
| 2019/0156301 A1* | 5/2019 | Bentov | H04L 9/0897 |
| 2019/0199514 A1* | 6/2019 | Hari | H04L 9/3239 |
| 2019/0251187 A1* | 8/2019 | Lin | G06F 16/1834 |
| 2019/0295049 A1* | 9/2019 | Karame | G06Q 20/0658 |
| 2019/0305931 A1 | 10/2019 | Borst et al. | |
| 2019/0306150 A1* | 10/2019 | Letz | H04L 9/3247 |
| 2019/0306190 A1* | 10/2019 | Suraparaju | H04L 9/50 |
| 2020/0076827 A1 | 3/2020 | Gluck et al. | |
| 2020/0228318 A1 | 7/2020 | Karame et al. | |
| 2020/0234293 A1 | 7/2020 | Lee et al. | |
| 2020/0252221 A1* | 8/2020 | Zamani | H04L 9/0869 |
| 2020/0358812 A1* | 11/2020 | Xiao | H04L 63/1441 |
| 2020/0364682 A1 | 11/2020 | Maloney et al. | |
| 2021/0406250 A1* | 12/2021 | Novo Diaz | G06F 16/2379 |
| 2022/0108313 A1* | 4/2022 | Ribeiro | G06Q 20/02 |

OTHER PUBLICATIONS

Conti, et al., "A survey on Security and Privacy Issues on Bitcoin," arXiv:1706.00916v3 [cs.CR], Dec. 25, 2017, 36 pages.

Eyal, et al., "How to Disincentivize Large Bitcoin Mining Pools," https://hackingdistributed.com/2014/06/19/bitcoin-and-voting-power/, Jun. 18, 2014, 15 pages.

Eyal, et al., "Majority is not Enough: Bitcoin Mining is Vulnerable," Department of Commuter Science, Cornell University, Nov. 2013, 19 pages.

Nesbitt, "Deep Chain Reorganization Detected on Ethereum Classic (ETC)," Jan. 7, 2019, 9 pages.

Ruffing, et al., "Liar, Liar, Coins on Fire!" Penalizing Equivocation by Loss of Bitcoins, [no date], 12 pages.

Solat, et al., "ZeroBlock: Timestamp-Free Prevention of Block-Withholding Attack in Bitcoin," arXiv:1605.02435v3 [cs.CR] May 3, 2017, 12 pages.

Zheng, et al., "Blockchain challenges and opportunities: a survey," Int. J. Web and Grid Services, vol. 14, Nov. 4, 2018, 25 pages.

* cited by examiner

APPARATUS AND METHOD FOR DISTINGUISHING BETWEEN LEGITIMATE AND MALICIOUS BRANCHES OF A SPLIT BLOCKCHAIN

CROSS REFERENCE TO REPLATED APPLICATIONS

This application is a continuation of U.S. patent application Ser. No. 16/442,529, filed Jun. 16, 2019, the entire disclosures of which are hereby incorporated by reference.

TECHNICAL FIELD

The present disclosure relates generally to split blockchains, and more particularly, to apparatuses and methods that distinguish between legitimate and malicious branches of a split blockchain.

BACKGROUND

Developed by Satoshi Nakamoto in 2009, Bitcoin is the first decentralized public ledger system. Since then, a number of similar blockchain-based cryptocurrencies have emerged. Blockchain is a distributed data processing protocol for retaining a public distributed ledger in a Peer-to-peer (P2P) network. Transaction data is recorded in blocks, and these blocks form a linked list (i.e., chain) of blocks. Each node in the network stores and maintains an entire copy of the ledger without requiring a central authority. In blockchain-based cryptocurrencies, each block contains the hash value of the previous block, making it hard to manipulate the transactions within. Normally, a consensus protocol is used to guarantee the data integrity among the nodes of the blockchain P2P network. There are several different consensus protocols used in different types of blockchains. See, e.g., Z. Zheng, S. Xie, H. Dai, X. Chen, and H. Wang, "Blockchain challenges and opportunities: A survey," Int. J. Web Grid Serv., 2016.

Proof-of-Work (PoW) is the most commonly used consensus protocol in blockchain-based cryptocurrencies. Major blockchains such as Bitcoin and Ethereum are both using different variety of the PoW protocol. In the PoW protocol, each peer node is competing to find a nonce value to produce a hash that meets a certain criteria. A nonce (number only used once) value is a number added to a hashed block that, when rehashed, meets the difficulty level restrictions. The nonce value is the number that the peer nodes are solving for. The difficulty of calculating such a nonce value can be calculated based on the criteria of the hash value. When such a nonce value is found, a block is generated and broadcasted to the P2P network. Depending on different varieties of the PoW protocol, peer nodes always accept the longest chain or the chain with the largest total difficulty repeatedly to continuously expand the blockchain. PoW utilizes this mechanism to determine which node has the right to seal a block. This process is also called mining and the peer nodes are called mining nodes or miners.

In such a mechanism, a peer node with greater computing speed (or sometimes called hash rate power) can calculate a nonce value faster than a peer node with less computing speed and thus has a higher probability of getting the right to seal a new block. However, this mechanism has a drawback. A selfish peer node with a hash rate power higher than those of the rest of the peer nodes combined can compromise the blockchain system by causing double spending and selfish mining, etc. See e.g., M. Conti, S. Kumar E, C. Lal, and S. Ruj, "A survey on security and privacy issues of Bitcoin," arXiv preprint arXiv:1706.00916, 2017, and Eyal, I. and Sirer, E. G. (2014) "Majority is not enough: Bitcoin mining is vulnerable", Proceedings of International Conference on Financial Cryptography and Data Security, Berlin, Heidelberg, pp. 436-454. This is commonly referred to as a 51% attack.

Some studies have proposed ways to avoid such kind of attacks. Eyal and Sirer in 2014 proposed a Two-Phase PoW (2P-PoW) solution preventing the formation of a mining pool with a huge hash power. See, I. Eyal and E. G. Sirer, "How to disincentivize large Bitcoin mining pools," 2014. In this solution, the second phase PoW requires a signature from the private key of the coinbase address. When the second PoW is sufficiently difficult, pool operators have to give out this private key to the pool miners in order to perform a calculation faster than all the peer nodes. Ruffing et al. in 2015 proposed contracts to penalize attackers attempting a double-spending attack. See, T. Ruffing et al., "Liar, liar, coins on fire!: Penalizing equivocation by loss of Bitcoins," ACM Conf. Comput. Commun. Secur., October 2015.

Solat and Potop-Butucaru proposed ZeroBlock in 2016. See, S. Solat and M. Potop-Butucaru, "ZeroBlock: Preventing selfish mining in Bitcoin," arXiv preprint arXiv: 1605.02435, 2016. The mechanism in ZeroBlock requires a block to be accepted by the peer nodes within a certain time interval after the timestamp of the block. Otherwise, the block is expired. This mechanism prevents attacker nodes from selfish mining for a long period of time. J. Bae and H. Lim in 2018 proposed a solution to randomly select a certain group of miners to have the right to mine the next block. See, J. Bae and H. Lim, "Random Mining Group Selection to Prevent 51% Attacks on Bitcoin," 2018 48th Annual IEEE/IFIP International Conference on Dependable Systems and Networks Workshops (DSN-W), Luxembourg City, 2018, pp. 81-82. doi: 10.1109/DSN-W.2018.00040.

Additional schemes to reduce the incidence of attacks on blockchains are desirable. The concepts disclosed below address this need and others.

SUMMARY

An apparatus for and method of distinguishing between a legitimate branch of a split blockchain and a malicious branch of the split blockchain is performed, for example, by one or more nodes of a decentralized network of nodes. One or more nodes determine a first measure of difficulty for a first branch of a split blockchain, and a second measure of difficulty for a second branch of the split blockchain. The first measure of difficulty is based on a measure of block generation frequency $r_i$ of each node that mined for the split blockchain during a window W that comprises blocks of the first branch. The first measure of difficulty is also based on a measure of difficulty d for each block k included in the window W. The second measure of difficulty is based on a measure of block generation frequency $r_i$ of each node that mined for the split blockchain during a window W that comprises blocks of the second branch. The second measure of difficulty is also based on a measure of difficulty d for each block k included in the window W. The one or more nodes then identify one of the first branch and the second branch as the legitimate branch based on a comparison of the first measure of difficulty and the second measure of difficulty. To this end, the branch with greater measure of difficulty is identified as the legitimate branch.

It is understood that other aspects of methods, apparatuses and mechanisms, will become readily apparent to those skilled in the art from the following detailed description, wherein various aspects are shown and described by way of illustration.

BRIEF DESCRIPTION OF THE DRAWINGS

Various aspects of methods, apparatuses and mechanisms will now be presented in the detailed description by way of example, and not by way of limitation, with reference to the accompanying drawings, wherein.

DETAILED DESCRIPTION

Disclosed in detail below is a mechanism that utilizes the frequency rate of miners over a history of blocks of a blockchain to calculate a total historical weighted difficulty for branched of a split blockchain. These measures of difficulty are used to distinguish between a legitimate branch of the split blockchain and a malicious branch of the split blockchain and to determine if a branch switch is needed. The mechanism combats against 51% attacks.

51% Attack Scheme and Cost

Figure 1:
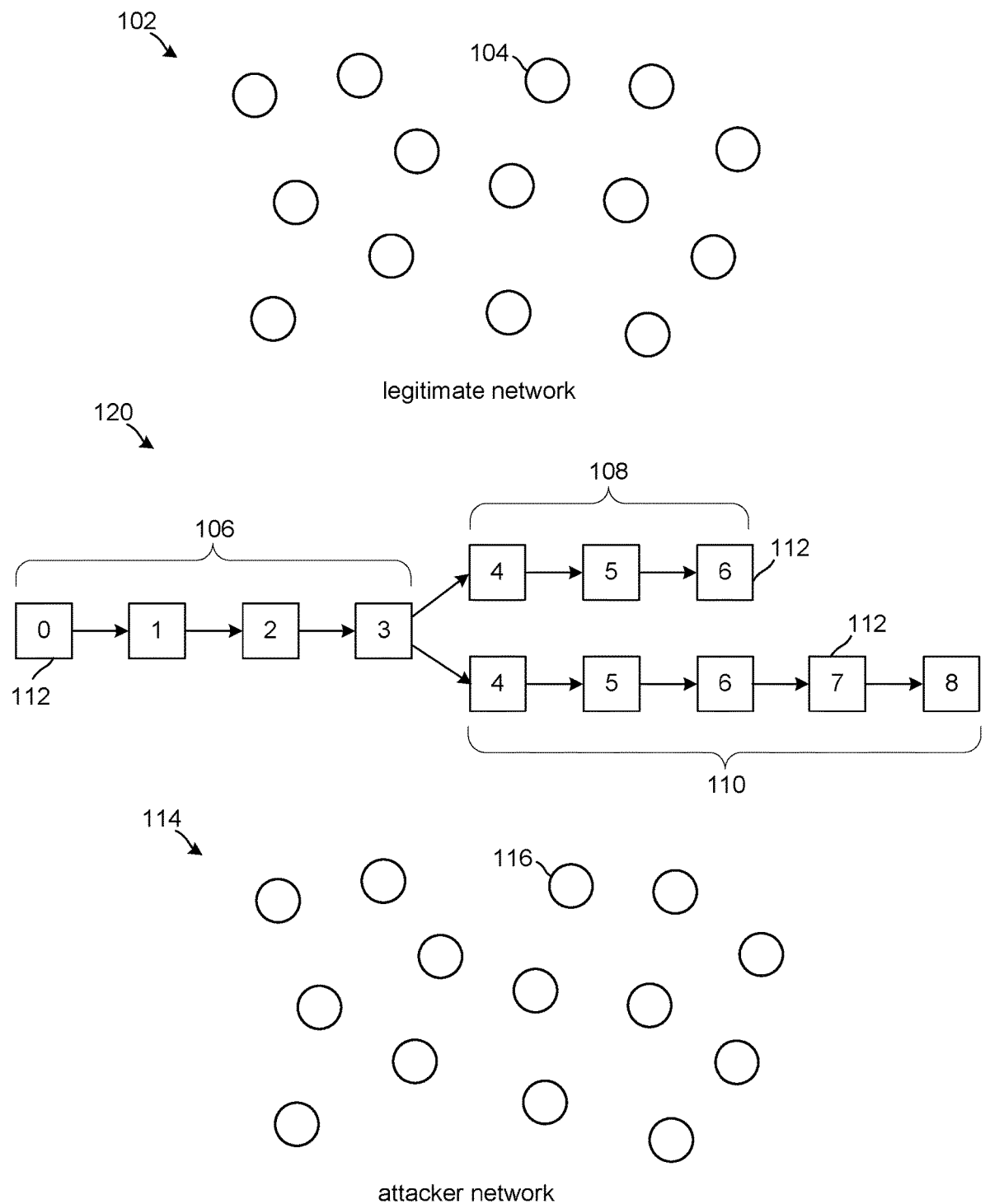
FIG. 1 is an illustration of a split blockchain including a legitimate branch and a malicious branch together with illustrations of a legitimate network of mining nodes and an attacker network of mining nodes that successfully conducts a 51% attack.

With reference to FIG. 1, an original blockchain 106 is split into a legitimate branch 108, which is essentially a continuation of the original blockchain, and a malicious branch 110, thus forming a split block chain 120. A first peer-to-peer network 102 of mining nodes 104, referred to herein as a legitimate network, is associated with the original blockchain 106 and the legitimate branch 108. The mining nodes 104 in the legitimate network 102 execute mining operations that lead to the addition of new blocks 112 to the original blockchain 106 and the legitimate branch 108.

A second peer-to-peer network 114 of mining nodes 116, referred to herein as an attacker network, is associated with the malicious branch 110. The mining nodes 116 in the attacker network 114 execute mining operations that lead to the addition of new blocks 112 to the malicious branch 110. One mechanism by which an attacker network 114 successfully creates a malicious branch 110 is the previously described 51% attack.

While the first peer-to-peer network 102 and the second peer-to-peer network 114 are illustrated as separate groups of nodes 104, 116, these nodes may be part of a large-scale, decentralized peer-to-peer network having a large number of distributed nodes. The number of nodes in the decentralized network may be, for example, around 10,000. While a large number of nodes may be present in a large-scale decentralized network, for ease of illustration, a reduced number of nodes are shown in FIG. 1.

Assume the current hash rate of a legitimate network 102 mining for an original blockchain 106 is $p_o$ and an attacker network 114 accumulates a greater hash rate power $p_a$ with $p_a > p_o$. The legitimate network 102 mines to create the original blockchain 106 and the legitimate branch $B_o$ 108. The attacker network 114, however, may utilize its greater hash rate power to generate or compute the malicious branch $B_a$ 110. To this end, the attacker network 114 performs double spending in the two branches—the legitimate branch 108 and the malicious branch 110. The attacker network 114 spends more in the malicious branch 110 to create a branch that is longer than the legitimate branch 108.

Before the malicious branch 110 becomes longer than legitimate branch 108, the attacker network 114 will not make it public to others, otherwise, the fork of branches is detected and solved by others prematurely. And the attacker will not be able to spend in the malicious branch. Once the malicious branch 110 is longer than the legitimate branch 108, the attacker network 114 reveals the longer malicious branch $B_a$ 110 and invalidates all transactions in legitimate branch $B_o$ 108. Such invalidation of the legitimate branch 108 is done by causing nodes 104 in the legitimate network 102 to accept the longer malicious branch 110 as the original blockchain, thus further expansion of the legitimate branch is abandoned in favor of the malicious branch.

The cost to launch such a 51% attack is:

$$\text{Cost} = (P^*R)^*f^*t$$

where,
P is the token price,
R is the block reward,
f is the frequency of block generation speed, and
t is the duration of the attack.

For many small blockchains, the cost to perform such an attack is only hundreds or thousands of US Dollars. See, PoW 51% attack cost, https://www.crypto51.app.

Another factor that makes the 51% attack scheme worse is that the greater hash rate power $p_a$ could be easily accessible to anyone who can pay the right price. For example, NiceHash provides an open market for hash rate exchange. See, NiceHash—Largest Crypto-Mining Marketplace to sell or purchase hash power, https://www.nicehash.com/. Anyone can easily pay with cryptocurrency to rent an available hash rate to mine for the targeted original blockchain 106. Accordingly, an attacker network 114 can accumulate a significant hash rate in a short period of time to exceed the 51% threshold. The attacker network 114 can double spend the token through a centralized exchange. The whole process only takes around 50-500 blocks. After that, the attacker network 114 can release the rented hash rate and walk away with the profit. Most recently, Ethereum Classic was attacked. Large amount of ETCs were double-spent in attack branch length ranged from 50 to 150. See, Deep Chain Reorganization Detected on Ethereum Classic (ETC), https://blog.coinbase.com/ethereum-classic-etc-is-currently-being-51-attacked-33be13ce32de.

Historical Weighted Difficulty Protocol to Combat 51% Attack

Figure 2:
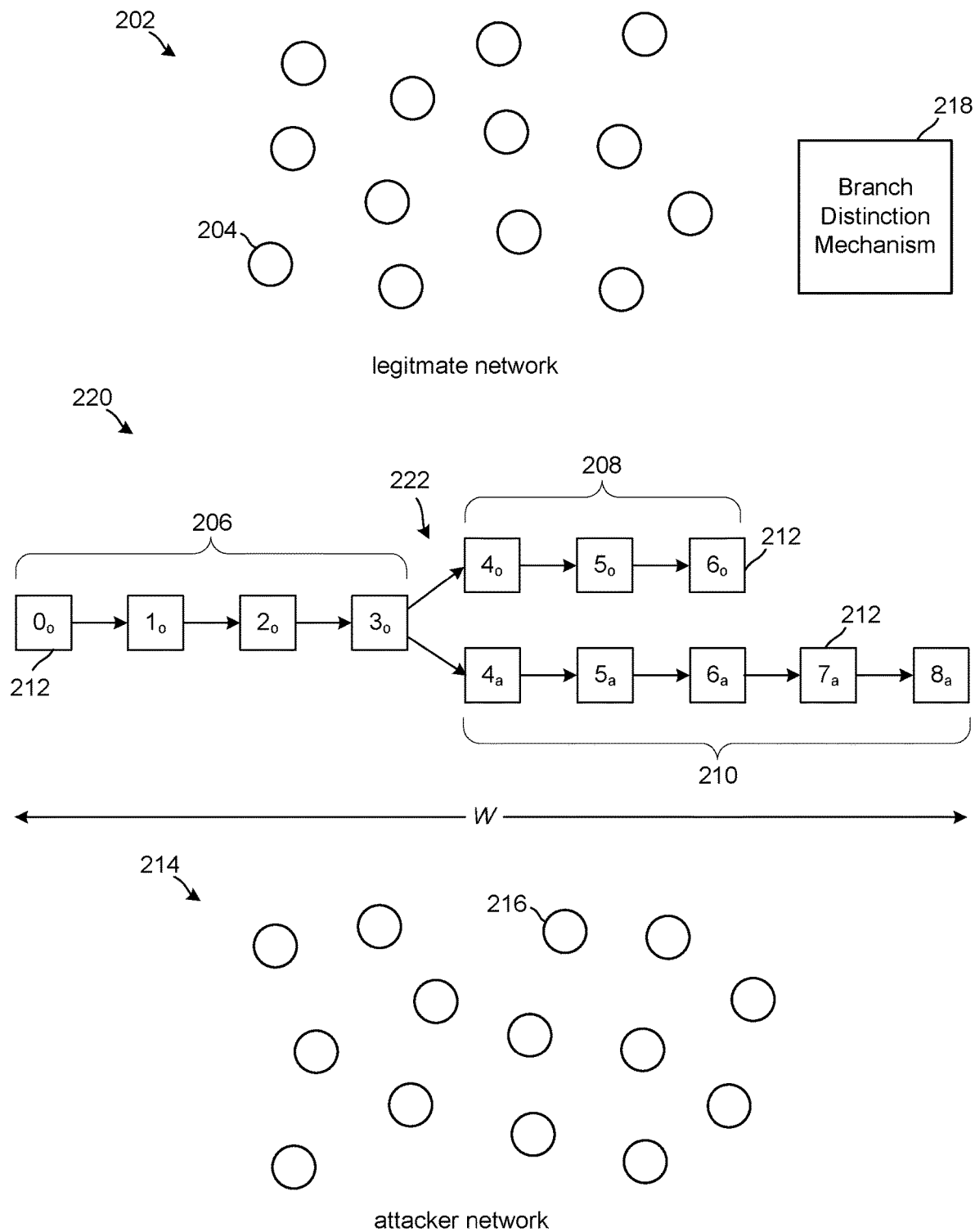
FIG. 2 is an illustration of a split blockchain including a legitimate branch and a malicious branch together with illustrations of a legitimate network of mining nodes operating in accordance with a branch distinction mechanism that combats against 51% attack attempts by an attacker network.

With reference to FIG. 2, similar to FIG. 1 an original blockchain 206 is split into a legitimate branch 208 and a malicious branch 210, thus forming a split blockchain 220. A legitimate network 202 of mining nodes 204 is associated with the original blockchain 206 and the legitimate branch 208. The mining nodes 204 in the legitimate network 202 execute mining operations that lead to the addition of new blocks 212 to the original blockchain 206 and the legitimate branch 208.

Likewise similar to FIG. 1, an attacker network 214 of mining nodes 216 is associated with the malicious branch 210. The mining nodes 216 in the attacker network 214 execute mining operations that lead to the addition of new blocks 212 to the malicious branch 210. In FIG. 2, however, the mining nodes 204 of the legitimate network 202 operate in accordance with a branch distinction mechanism 218 that enables the nodes to distinguish the legitimate branch 208 from the malicious branch 210. As such, the mining nodes 204 in the legitimate network 202 reject the longer malicious branch 210 as the original blockchain, and instead continue to mine for the legitimate branch 208; thereby reducing the incidence of 51% attacks.

The branch distinction mechanism 218, also referred to herein as a distinction protocol or scheme, calculates a measure of difficulty of each branch 208, 210 of a split blockchain with consideration of the miners addresses existence frequency in the previous blocks of the blockchain. This distinction mechanism 218 is referred to as a Historical Weighted Difficulty based Proof-of-Work (HWD-PoW) protocol. The assumption is that in a legitimate branch 208 of a split blockchain 220, miners of new blocks $4_o$, $5_o$, $6_o$ will most likely be the miners who mined blocks $0_o$, $1_o$, $2_o$, $3_o$ in the original blockchain 206, and the distribution will reflect the ratio in history. Furthermore, in a malicious branch 210, distribution of miners of new blocks $4_a$, $5_a$, $6_a$, $7_a$, $8_a$ will most likely be controlled by the attacker network 214, which will be different from the regular distribution of miners in the history. Therefore, when the history of miners' distribution is considered, the branch distinction mechanism 218 disclosed herein can easily distinguish legitimate branch 208 of an original blockchain 206 from a malicious branch 210.

In the branch distinction mechanism 218, a branch 208, 210 with miners of less representation in the original blockchain 206 will earn less weight in the total difficulty calculation. Therefore, to perform a 51% attack, a malicious miner in the attacker network 204 has two choices: either to mine a much longer malicious branch 210 prior to revealing that branch, or to build up its historical representation in the original blockchain 206 by mining for the original blockchain.

With continue reference to FIG. 2, the branch distinction mechanism 218 implements a historical weight difficulty (HWD) protocol that works to defend against a 51% attack. As part of the HWD protocol:

For a subject split blockchain 220, a measure of block generation frequency for a history window W of the split blockchain is calculated for each node 204, 216, i.e., miner, that has generated or minded a block 212 in the split blockchain. These measures of block generation frequency are calculated locally at each node in the peer node network, as follows:

$$r_i = \frac{\text{(number of blocks mined by node } i)}{\text{(total number of blocks mined in window } W)}$$

where, $$\sum_{i=0}^{n} r_i = 1$$

In order to properly associate a block 212 with the node 204, 216 that generated that block, each block in the split blockchain 220 has an associated signature corresponding to a hash that is derivable from the private key of the node that mined that block. By doing this, a malicious miner cannot counterfeit the identity of another miner.

A split 222 in a blockchain is detected by the legitimate network 202 when each node 204 receives two blocks with the same block number but with a different block hash. The split point in a split blockchain 220 is identified by a node 204 by tracing back to the common parent in the old blocks. For example, with reference to FIG. 2, if a node 204 receives each of blocks $6_o$ and $6_a$, it will recognize that each block has a different hash. Accordingly, the node 204 will trace back through the blockchain, through blocks $5_o$ and $5_a$ and $4_o$ and $4_a$ before reaching the common block $3_o$.

When the split 222 in the split blockchain 220 is detected, each peer node 204 associated with the legitimate network 202 calculates a measure of HWD for each branch 208, 210 of the split blockchain, for any unique miner k in the branch b, as follows:

$$HWD_b = HW_b * D_b = \sum_{k=1}^{l} r_k * d_k$$

where,
  $r_k$ is the block generation frequency $r_i$ in the history window W, for the node or miner that mined block k,
  $d_k$ is the difficulty of the block k, and
  l is the branch length, i.e., the number of blocks k in the branch 208, 210.

Difficulty is a metric based on the hashing power available in a network. A network having a higher hashing power (or computing power) has a higher measure of difficulty than a network having less hashing power. Essentially, a network having less miners has a lower measure of difficulty. For a given network, the difficulty metric is recalculated periodically, e.g., after certain number of blocks are created in a blockchain.

Note that when calculating the HWD of each branch 208, 210 only unique miners are counted. Thus, if the unique address of a miner appears in multiple blocks (thus indicating the miner has mined multiple blocks), it is only counted once in the $r_k$ summation component of HWD. For example, for a branch comprising five blocks (b1, b2, b3, b4 and b5) each mined by miner m1, the $r_k$ summation component is $r_1$ not $r_1+r_1+r_1+r_1+r_1$, where $r_1$ is the block generation frequency $r_i$ calculated for miner1. For a branch comprising five blocks (b1, b2, b3, b4 and b5) each mined by a respective miner m1, m2, m3, m4 and m5, the $r_k$ summation component is $r_1+r_2+r_3+r_4+r_5$, where $r_1$ is the block generation frequency $r_i$ calculated for miner1, $r_2$ is the block generation frequency $r_i$ calculated for miner2, $r_3$ is the block generation frequency $r_i$ calculated for miner3, $r_4$ is the block generation frequency $r_i$ calculated for miner4, and $r_5$ is the block generation frequency $r_i$ calculated for miner5. This is to discourage single high hash rate miner taking over block generation, thus encourage the decentralization of mining. It also increase the difficulty of attack.

Next, each peer node 204 compares the measures of HWD for the two branches 208, 210. The branch 208, 210 with greater HWD will be selected as the legitimate branch. As such, the mining nodes 204 in the legitimate network 202 reject the longer malicious branch 210 as the original blockchain, and instead continue to mine for the legitimate branch 208; thereby reducing the incidence of 51% attacks.

The immediate result of the HWD protocol is clear: if the attacker network 214 just brings in temporary new hash rate power, even if the malicious branch 210 is longer in difficulty, but the miner of the new branch is relatively new to the system, so the block generation frequency $r_i$ of the blocks is very low. The corresponding HWD for the malicious branch 210 will be very small compared to the legitimate branch 208. No peer node 204 in the legitimate branch 208 will switch to the malicious branch 210. This HWD scheme can easily defend rent-and-attack case.

If the attacker network 214 wants to make a node 204 switch to the malicious branch 210, i.e., join the attacker network 214, the attacker network will need to produce a higher HWD value for the malicious branch 210. As previously mentioned, in order to do this, a peer node 216 in the attacker network 214 will have to mine in the original blockchain 206 for a while to establish a historical presence in the original blockchain, so that when that peer node 216 switches to malicious branch 210, its HWD will be greater.

Figure 3:
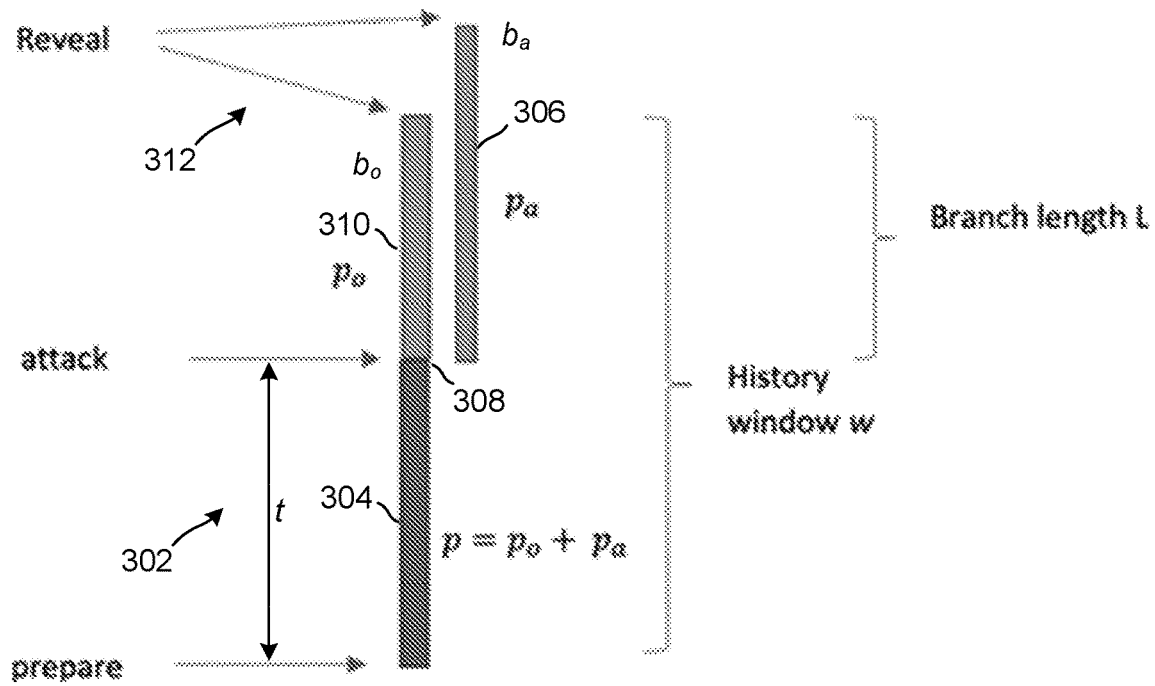
FIG. 3 is an illustration of a split blockchain including an original, legitimate branch and an attacker, malicious branch.

Further regarding the HWD protocol and with reference to FIG. 3, suppose $p_a$ is the hash rate of an attacker network formed by a number of malicious mining nodes and $p_o$ is the hash rate of a legitimate network formed by a number of legitimate mining nodes. In order to prepare for an attack, the attacker network needs to spend hash rate $p_a$ for a time duration t in a common part 304 of the split blockchain 302 that precedes the split. Thus, the combined hash rate spent by the legitimate network and the attacker network in the common part 304 is $p=p_o+p_a$. Note that the common part 304 of the split blockchain 302 branch corresponds to the original blockchain 206 in FIG. 2.

The quick strategy of distribution of hash rate $p_a$ spending by the attacker network is to mine for one-half the duration of the history window w and then switch its mining to the malicious branch 306 at the attack point 308. In order for the attack to be successful, $$p_a > p_o$$

As a result, the revealed malicious branch 306 $b_a$ will be longer than the legitimate branch 310. Note that the legitimate branch 310 of the split blockchain 302 corresponds to the legitimate branch 208 in FIG. 2.

At the reveal time 312, the HWD of the legitimate branch 310 is:

$$HWD_b = D_o * \sum_{k=0}^{l} r_k^2 = D_o * \left(\frac{1}{2} - \delta\right)$$

where,
$D_o$ is the difficulty of the original branch $b_o$, which includes the common part 304 and the legitimate branch 310 of the split blockchain,
$r_k$ is the block generation frequency in the original branch $b_o$ in the history window w, for the unique miner that mined block k,
l is the branch length, i.e., the number of blocks k in the original branch $b_o$, and
$\delta$ is the minimal marginal difference accepted by a peer node.

At the reveal time 312, the HWD of the malicious branch 306 is:

$$HWD_b = \left(\frac{1}{2} + \delta\right) * \frac{w-l}{w} * D_a$$

where,
$D_a$ is the difficulty of the malicious branch $b_a$, which includes the common part 304 and the malicious branch 306 of the split blockchain,
l is the branch length, i.e., the number of blocks in the branch,
w is the history window length, i.e., the number of blocks in the window Therefore:

$$\left(\frac{1}{2} + \delta\right) * \frac{w-l}{w} * D_a > \left(\frac{1}{2} - \delta\right) * D_a$$

Because $D_a$ and $D_o$ are close to each other in such a condition, the above equation simplifies to:

$$\left(\frac{1}{2} + \delta\right) * \frac{w-l}{w} > \left(\frac{1}{2} - \delta\right)$$

From which is derived:

$$\delta > \frac{l}{4w - 2l}$$

To summarize, the cost of the attacker node is to prepare mining for (w−1) duration with hash rate $p_o*(\frac{1}{2}+l/(4w-2l))$.

For a typical attack, l needs to be around 50-500 blocks to allow token withdrawal from a token exchange. From the below section, the change of miners is not very frequent. We can easily set w>one month to increase the history weight. With w=100,000 blocks, the robustness against attack is increased by over 100 times.

Although the HWD protocol disclosed herein may not totally prevent 51% attacks, its does dramatically increase the money cost and time it takes to prepare a potential attack by at least two orders of magnitude, thus serving as a detriment to would be attackers. Also, because the attacker needs to spend quite a long time t to prepare for the attack, the attack is much less likely to happen as the long period of time causes a lot of opportunity cost and uncertainty.

Additional Improvement Schemes

Orthogonal to the disclosed HWD scheme, additional improvement schemes can be applied to further increase the cost of attack.

The first approach is to place a cap on the measure of block generation frequency that a node may have. For example, the cap may require that any measure of block generation frequency $r_i < r_c$, which means that $r_i$ for a single mining node can never exceed $r_c$, even if the node generates more blocks within the history window. This approach encourages a more diversified pool of mining nodes. At the same time, the attacker network could purposely split the mining hash rate into multiple mining nodes to make sure each mining node is below $r_c$. This will circumvent the diversification requirement. However, the requirement is still useful, as it increase the cost for attackers to maintain multiple miner accounts.

The second approach is to post an overlap requirement between two split branches. To minimize the cost of an attack, an attacker network will focus its hash rate to the malicious branch. The overlap requires that any split branch of a blockchain possess a certain amount of mining nodes that overlap with the mining nodes in the pre-split part of the blockchain. Under such a condition, in order for a branch switch to happen, one needs to satisfy not only the HWD condition, $$HWD_a > HWD_o$$

but also, the overlap between two sets of mining nodes need to be greater than s, $$\{r_i\} \cap \{r_k\} > s$$

where, $r_i$ are the miners' frequency of original branch, i.e., the pre-split part of the blockchain, and $r_k$ are the miners' frequency of attacker branch, i.e., the split branch.

Thus, the system discourages sudden hash power switch from one set of mining nodes to another distinct set of mining nodes. With such an enhanced requirement, if s=0.25, an attacker network needs to have three times of its current hash rate within time duration w. This means an attacker network needs to keep some hash rate in the original branch, and twice more in the malicious branch to compensate for the effect. Therefore, by introducing such a requirement, the time cost doubles and the money cost triples to perform an attack. For higher s, the attacker network needs to spend even more hash rate than the minimal case.

Figure 4:
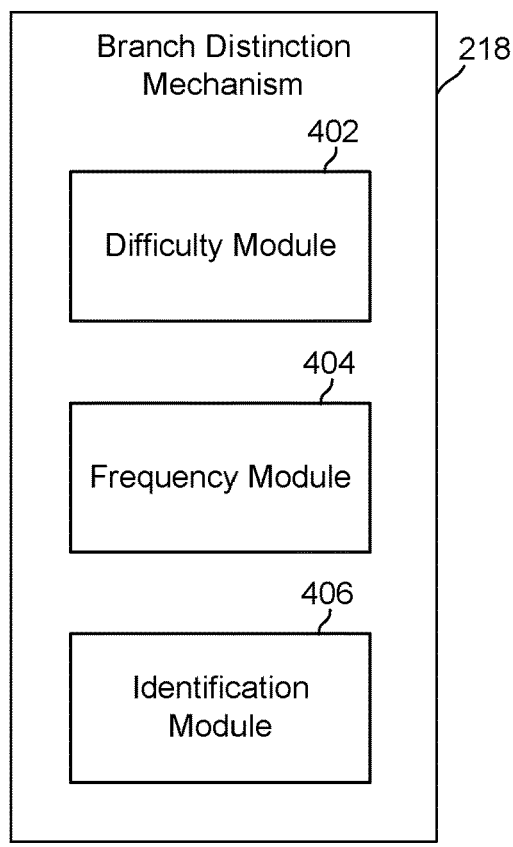
FIG. 4 is a block diagram of the branch distinction mechanism of FIG. 2.

With reference to FIG. 4, the branch distinction mechanism 218 involves three functional modules, including a difficulty module 402, a frequency module 404, and an identification module 406. The difficulty module 402 is configured to determine each of: 1) a first measure of difficulty for a first branch of a split blockchain and 2) a second measure of difficulty for a second branch of the split blockchain. The frequency module 404 is configured to determine each of: 1) a measure of block generation frequency $r_i$ of each node that mined for the split blockchain during a window W that comprises blocks of the first branch and blocks of a part of the split blockchain that precedes the first branch, and 2) a measure of block generation frequency $r_i$ of each node that mined for the split blockchain during a window W that comprises blocks of the second branch and blocks of a part of the split blockchain that precedes the second branch. The identification module 406 is configured to identify one of the first branch and the second branch as the legitimate branch based on a comparison of the first measure of difficulty and the second measure of difficulty. The functions of these modules may be executed by one or more nodes 204 of a decentralized network 202 of nodes associated with the mining operations of split blockchain 220.

Figure 5:
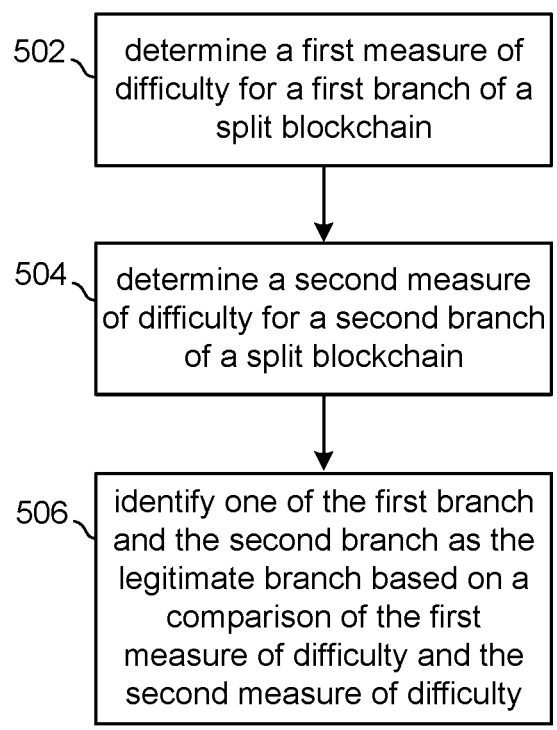
FIG. 5 is a flowchart of a method of distinguishing between a legitimate branch of a split blockchain and a malicious branch of the split blockchain.

FIG. 5 is a flowchart of an example method of distinguishing between a legitimate branch 208 of a split blockchain 220 and a malicious branch 210 of the split blockchain. The method may be performed, for example, by one or more nodes 204 of a decentralized network 202 of nodes, where each node is configured to implement the branch distinction mechanism 218 like the one in FIG. 4.

At block 502, one or more nodes 204 of a decentralized network 202 determine a first measure of difficulty for a first branch 208 of a split blockchain 220. The first measure of difficulty is based on a measure of block generation frequency $r_i$ of each node 204 that mined for the split blockchain 220 during a window W that comprises blocks of the first branch 208 and blocks of a part 206 of the split blockchain that precedes the first branch. The first measure of difficulty is also based on a measure of difficulty d for each block k included in the window W.

At block 504, one or more nodes 204 of a decentralized network 202 of nodes determine a second measure of difficulty for a second branch 210 of the split blockchain 220. The second measure of difficulty is based on a measure of block generation frequency $r_i$ of each node 204 that mined for the split blockchain 220 during a window W that comprises blocks of the second branch 210 and blocks of a part 206 of the split blockchain that precedes the first branch. The second measure of difficulty is also based on a measure of difficulty d for each block k included in the window W.

Regarding each of the first and second measures of difficulty, the respective measures of block generation frequency $r_i$ of each node 204 correspond to a measure of the frequency of blocks in the split blockchain 220 that were mined by that node. These measures of the block generation frequency $r_i$ for a node i may be determined as follows:

$$r_i = \frac{\text{(number of blocks mined by node } i)}{\text{(total number of blocks mined in window } W)}.$$

In one implementation, a cap value $r_c$ is set, which defines a value that a block generation frequency $r_i$ for a node i cannot exceed.

Having determined the respective measures of block generation frequency $r_i$ of each node 204, each of the first measure of difficulty for the first branch of the split blockchain and the second measure of difficulty for the second branch of the split blockchain, may be determined as follows:

$$HWD_b = HW_b * D_b = \sum_{k=1}^{l} r_k * d_k$$

where, $r_k$ is the block generation frequency in the history window W, for the node that mined the block k, $d_k$ is the difficulty of the block k, and l is the branch length, i.e., for the first branch 208-l is the number of blocks k in the first branch 208; for the second branch 210-l is the number of blocks k in the second branch 210.

Continuing with FIG. 5, at block 506, one or more nodes 204 of a decentralized network 202 identifies one of the first branch and the second branch as the legitimate branch based on a comparison of the first measure of difficulty and the second measure of difficulty. To this end, the branch 208, 210 with greater measure of difficulty is identified as the legitimate branch.

In one configuration, an overlap requirement between the first branch 208 of the split blockchain 220 a part 206 of the split blockchain that precedes the split is implemented. A same or similar overlap requirement between the second branch 210 of the split blockchain 220 a part 206 of the split blockchain that precedes the split is implemented. The overlap requirement establishes a threshold number of mining nodes that each of the first branch and the second branch must have in common with nodes that mined for the part 206 of the split blockchain that precedes the split. Any branch for which the overlap requirement is not met is considered a malicious branch.

Figure 6:
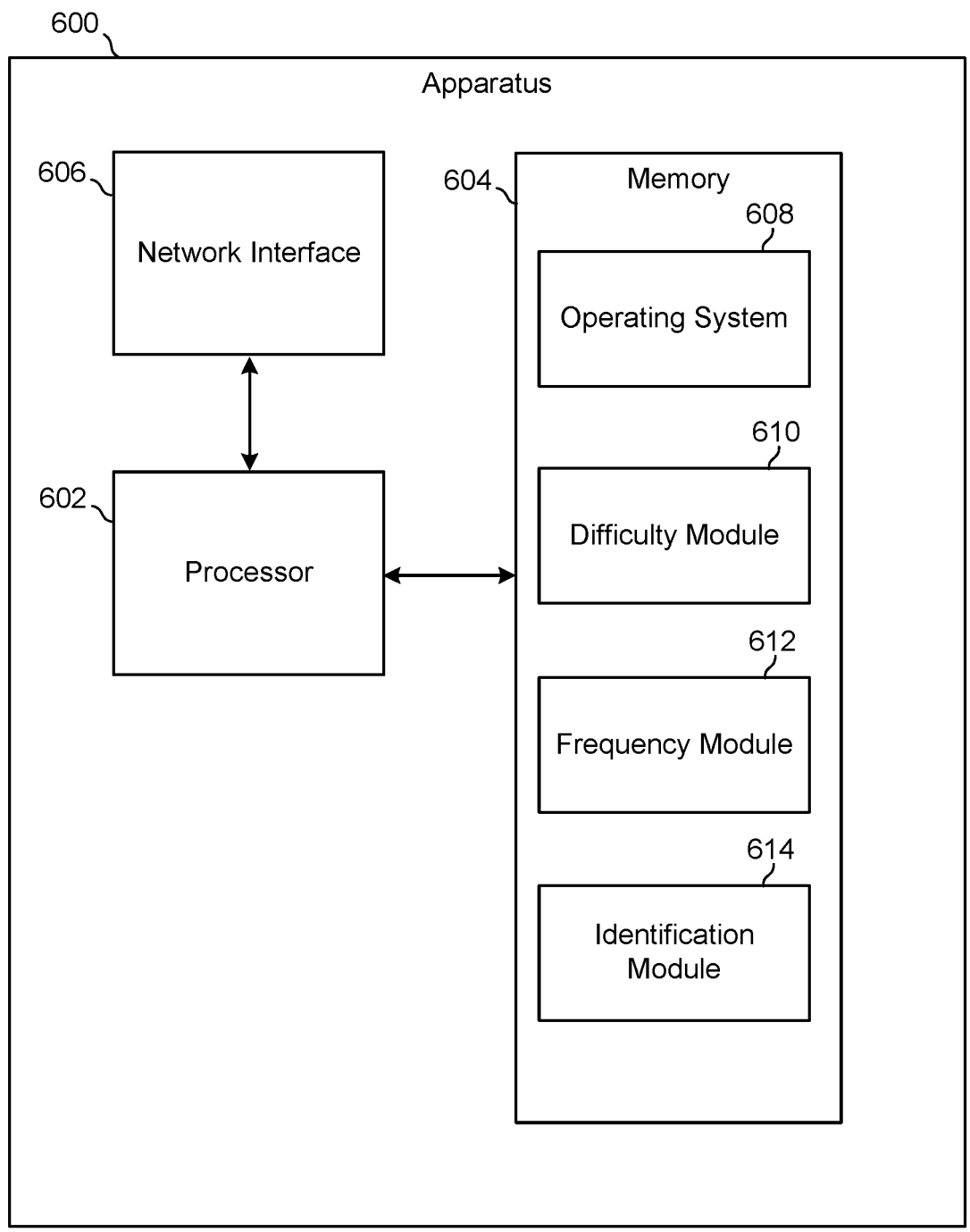
FIG. 6 is a block diagram of an apparatus configured to implement the method of FIG. 5.

FIG. 6 is a schematic block diagram of an apparatus 600. The apparatus 600 may correspond to one of the one or more nodes 204 of a decentralized network 202 of nodes, where each node is configured to implement a branch distinction mechanism, as described above with reference to FIGS. 2, 3, 4 and 5.

The apparatus 600 may include one or more processors 602 configured to access and execute computer-executable instructions stored in at least one memory 604. The processor 602 may be implemented as appropriate in hardware, software, firmware, or combinations thereof. Software or firmware implementations of the processor 602 may include computer-executable or machine-executable instructions written in any suitable programming language to perform the various functions described herein. The processor 602 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 600 may also include a chipset (not shown) for controlling communications between the processor 602 and one or more of the other components of the apparatus 600. The processor 602 may also include one or more application-specific integrated circuits (ASICs) or application-specific standard products (ASSPs) for handling specific data processing functions or tasks.

The memory 604 may include, but is not limited to, random access memory (RAM), flash RAM, magnetic media storage, optical media storage, and so forth. The memory 604 may include volatile memory configured to store information when supplied with power and/or non-volatile memory configured to store information even when not supplied with power. The memory 604 may store various program modules, application programs, and so forth that may include computer-executable instructions that upon execution by the processor 602 may cause various operations to be performed. The memory 604 may further store a variety of data manipulated and/or generated during execution of computer-executable instructions by the processor 602.

The apparatus 600 may further include one or more network interfaces 606 that may facilitate communication between the apparatus 600 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 604 may store various program modules, application programs, and so forth that may include computer-executable instructions that upon execution by the processor 602 may cause various operations to be performed. For example, the memory 604 may include an operating system module (O/S) 608 that may be configured to manage hardware resources such as the network interface 606 and provide various services to applications executing on the apparatus 600.

The memory 604 stores additional program modules such as a difficulty module 610, a frequency module 612, and an identification module 614, each of which includes functions in the form of logic and rules that respectively support and enable the measurement and identification functions described above with reference to FIGS. 2, 3, 4 and 5. Although illustrated as separate modules in FIG. 6, one or more of the modules may be a part of or a submodule of another module.

The apparatus 600 and modules 610, 612, 614 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Example HWD Algorithm

In this section, an algorithm to perform HWD based branch selection is presented.

Below is the pseudo code to calculate the HWD,

---

Algorithm 1 Calculation of HWD

1: function HWDCALCULATION(W, B) ▷ Where W - array of historic blocks window, B - array of branch blocks
2:  HW = 0
3:  d = 0
4:  w = Length(W)
5:  l = Length(B)
6:  Let R[1 . . . l] be new arrays
7:  for i = 1 to l do    ▷ Calculate miner appearance frequency in historic blocks window
8:   R[i] = 0
9:   for j = 1 to w do
10:    if Miner(W[j]) == Miner(B[i]) then
11:     R[i]+ = 1
12:   R[i]/ = w
13:  for k = 1 to Length(B) do ▷ Sum Historic Weight
14:   HW = HW + R[k]
15:  for k = 1 to Length(B) do ▷ Sum branch difficulty
16:   d = d + Diff(B[k])
17:  HWD = HW * d

---

Real Data Statistics From Ethereum

We picked a well-known PoW blockchain platform Ethereum. We analyzed block information of first 6,000,000 blocks, which is about 3 years mining history. The first task is to find out the distribution of miners with significant hash rate. The analysis shows that the miner distribution has a strong correlation with past history. At block #2,000,000, #4,000,000, #6,000,000, the following 360 blocks were analyzed. Each miner's weight in the 360-block and weight in the 2M-block is shown in the tables below:

TABLE 1

ETHEREUM BLOCK MINERS FROM 2,000,001 To 2,000,360

| Miner | Weight | Amount | Weight_in_2M |
|---|---|---|---|
| 0x2a65 . . . 8226 | 0.272222 | 98 | 0.239315 |
| 0x61c8 . . . 0bd9 | 0.177778 | 64 | 0.049251 |
| 0xbcdf . . . 41d1 | 0.163889 | 59 | 0.023924 |
| 0xea67 . . . 8ec8 | 0.116667 | 42 | 0.036458 |
| 0x4bb9 . . . 1b01 | 0.063889 | 23 | 0.057752 |
| 0xa42a . . . e84e | 0.055556 | 20 | 0.001293 |
| 0x52bc . . . e3b5 | 0.038889 | 14 | 0.147223 |
| 0x1a06 . . . 58f1 | 0.030556 | 11 | 0.004212 |
| 0x6879 . . . 01da | 0.025000 | 9 | 0.023600 |
| 0xd138 . . . a31c | 0.005556 | 2 | 0.000053 |
| 0xf3b9 . . . c2fb | 0.005556 | 2 | 0.008294 |
| 0xa027 . . . e88f | 0.005556 | 2 | 0.012287 |
| 0x1654 . . . d5de | 0.002778 | 1 | 0.001272 |
| 0x186a . . . b0f2 | 0.002778 | 1 | 0.000001 |
| 0x2cb7 . . . 6402 | 0.002778 | 1 | 0.000004 |
| 0x30b6 . . . 4e6d | 0.002778 | 1 | 0.002430 |
| 0x40ce . . . f821 | 0.002778 | 1 | 0.000954 |
| 0x5979 . . . e584 | 0.002778 | 1 | 0.000116 |
| 0x6caf . . . a46d | 0.002778 | 1 | 0.001050 |
| 0x7a14 . . . 0b95 | 0.002778 | 1 | 0.001233 |
| 0x9148 . . . a49d | 0.002778 | 1 | 0.000021 |
| 0x94ce . . . a2f7 | 0.002778 | 1 | 0.000944 |
| 0x9558 . . . 7211 | 0.002778 | 1 | 0.011990 |
| 0xadd8 . . . db02 | 0.002778 | 1 | 0.000039 |
| 0xd3d0 . . . ee9d | 0.002778 | 1 | 0.001598 |
| 0xdc3f . . . e455 | 0.002778 | 1 | 0.000340 |

[a]Total miners' weight from previous 2 million blocks is 62.57%.

TABLE II

ETHEREUM BLOCK MINERS FROM 4,000,001 To 4,000,360

| Miner | Weight | Amount | Weight_in_2M~4M |
|---|---|---|---|
| 0x1e99 . . . 0341 | 0.138889 | 50 | 0.079728 |
| 0x2A65 . . . 8226 | 0.072222 | 26 | 0.167880 |
| 0x4bb9 . . . 1b01 | 0.016667 | 6 | 0.058859 |
| 0x52bc . . . e3b5 | 0.075000 | 27 | 0.045849 |
| 0x73b8 . . . 7fea | 0.005556 | 2 | 0.007535 |
| 0x829b . . . a830 | 0.283333 | 102 | 0.012240 |
| 0x8727 . . . 87a5 | 0.005556 | 2 | 0.000331 |
| 0x9435 . . . 7805 | 0.008333 | 3 | 0.003338 |
| 0x9633 . . . a11c | 0.008333 | 3 | 0.005184 |
| 0xa027 . . . e88f | 0.002778 | 1 | 0.001355 |
| 0xa42a . . . e84e | 0.005556 | 2 | 0.033483 |
| 0xa4aa . . . 7f0d | 0.005556 | 2 | 0.003277 |
| 0xa9a9 . . . 51fc | 0.002778 | 1 | 0.000911 |
| 0xb293 . . . 0347 | 0.086111 | 31 | 0.032167 |
| 0xc0ea . . . 2949 | 0.033333 | 12 | 0.072130 |
| 0xea67 . . . 8ec8 | 0.236111 | 85 | 0.169016 |
| 0xf3b9 . . . c2fb | 0.013889 | 5 | 0.015585 |

[a]Total miners' weight from previous 2 million blocks is 70.89%.

Figure 7:
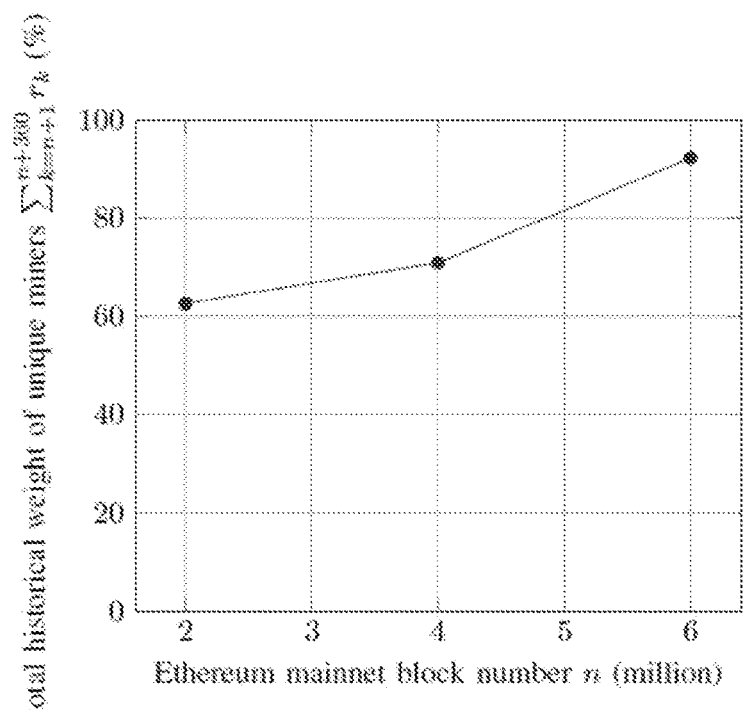
FIG. 7 is a graph illustrating the total historical weight of unique miners as a function of the number of blocks in a blockchain.

The total weight of 360-block miners has a strong correlation with the distribution in the history window, even if the history used is 2 million (M) blocks long (about one year). The result is shown in FIG. 7. This supports the assumption that the participation rate of legitimate miners is relatively stable.

TABLE III

ETHEREUM BLOCK MINERS FROM 6,000,001 To 6,000,360

| Miner | Weight | Amount | Weight_in_4M~6M |
|---|---|---|---|
| 0x0019 . . . 99e8 | 0.002778 | 1 | 0.000784 |
| 0x1ca4 . . . be1a | 0.019444 | 7 | 0.000904 |
| 0x2a65 . . . 8226 | 0.027778 | 10 | 0.035354 |
| 0x35f6 . . . 738d | 0.005556 | 2 | 0.000325 |
| 0x4a07 . . . a82b | 0.005556 | 2 | 0.002980 |
| 0x4bb9 . . . 1b01 | 0.002778 | 1 | 0.015724 |
| 0x52bc . . . e3b5 | 0.116667 | 42 | 0.125527 |
| 0x52e4 . . . f13c | 0.013889 | 5 | 0.007205 |
| 0x5a0b . . . 9c4c | 0.133333 | 48 | 0.108651 |
| 0x6a7a . . . 9b1f | 0.008333 | 3 | 0.008874 |
| 0x70ae . . . e21d | 0.008333 | 3 | 0.002358 |
| 0x829b . . . a830 | 0.127778 | 46 | 0.210382 |
| 0x914d . . . 1dcd | 0.002778 | 1 | 0.000168 |
| 0x92e3 . . . b549 | 0.002778 | 1 | 0.000822 |
| 0x9435 . . . 7805 | 0.002778 | 1 | 0.007071 |
| 0xb293 . . . 0347 | 0.105556 | 38 | 0.098562 |
| 0xb75d . . . 22f5 | 0.011111 | 4 | 0.005698 |
| 0xb8f8 . . . 5453 | 0.002778 | 1 | 0.000668 |
| 0xcc16 . . . e610 | 0.002778 | 1 | 0.002227 |
| 0xd100 . . . 4fce | 0.002778 | 1 | 0.000470 |
| 0xd380 . . . 636d | 0.002778 | 1 | 0.000002 |
| 0xd438 . . . 1807 | 0.011111 | 4 | 0.000594 |
| 0xd958 . . . 4012 | 0.013889 | 5 | 0.000263 |
| 0xd9cf . . . 06e3 | 0.002778 | 1 | 0.000108 |
| 0xe4bd . . . 0649 | 0.005556 | 2 | 0.003712 |
| 0xea67 . . . 8ec8 | 0.322222 | 116 | 0.259396 |
| 0xf3b9 . . . c2fb | 0.036111 | 13 | 0.023992 |

[a]Total miners' weight from previous 2 million blocks is 92.28%.

Therefore, miners' historical weight is a valuable information to utilize to fight against 51% attack. We also observed that correlation of new miners with previous 2M blocks is strengthened, as it indicates that Ethereum mining is going towards centralization.

We further created an simulation to perform 51% attack at the point of block #2M, #4M and #6M, and computed the result for window length of 1M and 2M. To make it close to real case, 51% of miners a certain length back from attack point were randomly flagged to be malicious, which represents the attack preparation period. From the list of malicious miners, the top 360 miners were picked as the attacking branch generator. If the HWD of attacking branch is higher than those of the original branch, it is considered a successful attack.

Figure 8:
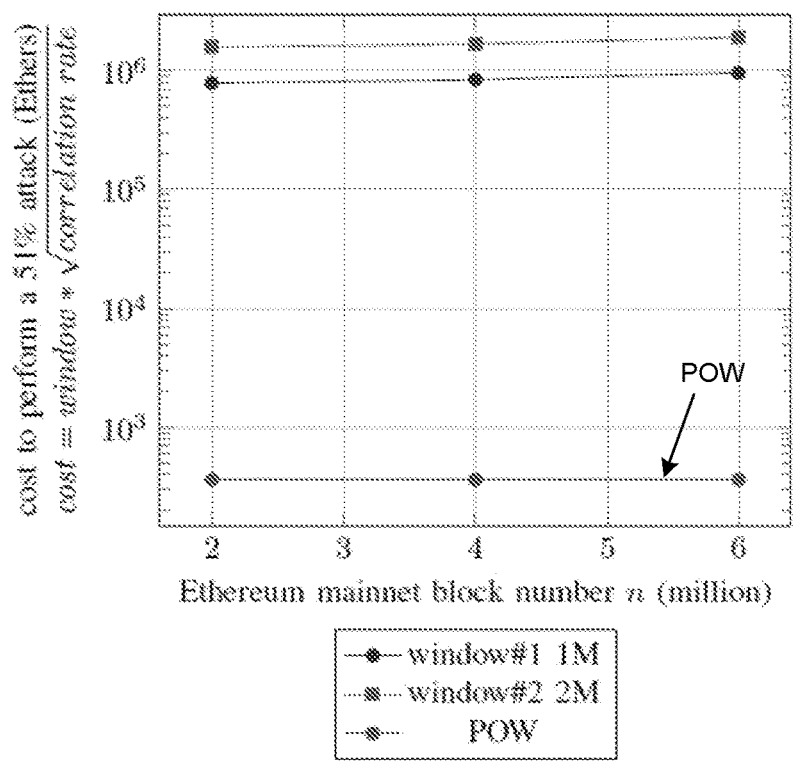
FIG. 8 is a graph comparing the cost of performing a 51% attack as a function of the number of blocks in a blockchain under scenarios where the HWD scheme has a 1 million block window, where the HWD has a 2 million block window, and where the HWD scheme is not applied.

In the ideal case, the preparation should be at least longer than the specified window. However, given the correlation of distribution, the preparation period was slightly shorter. The simulation were run multiple times for each window to get the average accumulated cost. Here, the mining reward halving effect over the time was ignored. The result is shown in FIG. 8.

The result indicates that with the HWD scheme, the cost of attacking the Ethereum Mainnet blockchain is increased by more than 1000 times when the window size is set to 1M or 2M blocks. In real application, the window could be shorter to speed up the process. In one configuration, setting the window size to at least 100k, makes the cost of attack 100× more expensive.

CONCLUSION

Disclosed herein is a mechanism that utilizes the frequency rate of miners over a history of blocks of a blockchain to calculate a total historical weighted difficulty for branched of a split blockchain. These measures of difficulty are used to distinguish between a legitimate branch of the split blockchain and a malicious branch of the split blockchain and to determine if a branch switch is needed.

In this disclosure software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of distinguishing between a legitimate branch of a split blockchain and a malicious branch of the split blockchain, the method comprising:
    determining a first measure of difficulty for a first branch of the split blockchain;
    determining whether the first branch is the legitimate branch of the split blockchain based on the first measure of difficulty;
    wherein the first measure of difficulty is based on:
    a measure of block generation frequency $r_i$ of each node that mined for the split blockchain during a window W; and
    a measure of difficulty d for each block k included in the window W.

2. The method of claim 1, wherein the measure of block generation frequency $r_i$ for a node i is a function of the number of blocks mined by node 1 and the total number of blocks mined in the window W.

3. The method of claim 2, wherein the measure of block generation frequency $r_i$ of each node corresponds to a measure of blocks in the split blockchain that were mined by that node.

4. The method of claim 1, wherein the measure of block generation frequency $r_i$ for a node i is determined as follows:

$$r_i = \frac{\text{(number of blocks mined by node } i)}{\text{(total number of blocks mined in window } W)}.$$

5. The method of claim 4, further comprising setting a cap value $r_c$ that a block generation frequency $r_i$ for a node i cannot exceed.

6. The method of claim 1, wherein the first measure of difficulty for the first branch of the split blockchain is determined as follows:

$$HWD_b = \sum_{k=1}^{l} r_k * d_k$$

where,
   $r_k$ is the measure of block generation frequency $r_i$ in a history window W, for the node that mined block k,
   $d_k$ is the difficulty of the block k, and
   l is a branch length corresponding to a number of blocks k in the first branch.

7. The method of claim 1, wherein the measure of block generation frequency $r_i$ of each node corresponds to a measure of blocks in the split blockchain that were mined by that node.

8. The method of claim 1, further comprising setting a cap value $r_c$ that a block generation frequency $r_i$ for a node i cannot exceed.

9. The method of claim 1, further comprising implementing an overlap requirement between the first branch of the split blockchain and the pre-split part of a blockchain, wherein the first branch of the split blockchain and the pre-split part of the blockchain has at least a threshold number of nodes that mined for the blockchain in common.

10. An apparatus for distinguishing between a legitimate branch of a split blockchain and a malicious branch of the split blockchain, the apparatus comprising:
    a non-transitory memory; and
    a processor coupled to the memory and configured to:
        determine a first measure of difficulty for a first branch of the split blockchain;
        determining whether the first branch is the legitimate branch of the split blockchain based on the first measure of difficulty;
        wherein the first measure of difficulty is based on:
        a measure of block generation frequency $r_i$ of each node that mined for the split blockchain during a window W; and
        a measure of difficulty d for each block k included in the window W.

11. The apparatus of claim 10, wherein the measure of block generation frequency $r_i$ for a node i is a function of the number of blocks mined by node i and the total number of blocks mined in the window W.

12. The apparatus of claim 10, wherein the measure of block generation frequency $r_i$ for a node i is determined as follows:

$$r_i = \frac{\text{(number of blocks mined by node } i)}{\text{(total number of blocks mined in window } W)}.$$

13. The apparatus of claim 10, wherein the first measure of difficulty for the first branch of the split blockchain is determined as follows:

$$HWD_b = \sum_{k=1}^{l} r_k * d_k$$

where,
   $r_k$ is the measure of block generation frequency $r_i$ in a history window W, for the node that mined block k,
   $d_k$ is the difficulty of the block k, and
   l is a branch length corresponding to a number of blocks k in the first branch.

14. A method of distinguishing between a legitimate branch of a split blockchain and a malicious branch of the split blockchain, the method comprising:
 determining a first measure of difficulty for a first branch of the split blockchain;
 determining whether the first branch is the legitimate branch of the split blockchain based on the first measure of difficulty;
 wherein the first measure of difficulty is based on:
 a measure of block generation frequency $r_i$ of each node that mined for the split blockchain during a window W; and
 a measure of difficulty d for each block k included in the window W;
 wherein the measure of block generation frequency $r_i$ for a node i is a function of the number of blocks mined by node 1 and the total number of blocks mined in the window W;
 wherein the measure of block generation frequency $r_i$ of each node corresponds to a measure of blocks in the split blockchain that were mined by that node;
 wherein the measure of block generation frequency $r_i$ for the node i is determined as follows:

$$r_i = \frac{\text{(number of blocks mined by node } i\text{)}}{\text{(total number of blocks mined in window } W\text{)}}$$

wherein the method further comprising setting a cap value $r_c$ that the block generation frequency $r_i$ for the node i cannot exceed;
 wherein the first measure of difficulty for the first branch of the split blockchain is determined as follows:

$$HWD_b = \sum_{k=1}^{l} r_k * d_k$$

where,
 $r_k$ is the measure of block generation frequency $r_i$ in a history window, for the node that mined block k,
 $d_k$ is the difficulty of the block k, and
 l is a branch length corresponding to a number of blocks k in the first branch;
 wherein the measure of block generation frequency $r_i$ of each node corresponds to a measure of blocks in the split blockchain that were mined by that node;
 wherein the method further comprising implementing an overlap requirement between the first branch of the split blockchain and the pre-split part of a blockchain, wherein the first branch of the split blockchain and the pre-split part of the blockchain has at least a threshold number of nodes that mined for the blockchain in common.

* * * * *